(12) United States Patent  
Mysore et al.

(10) Patent No.: US 8,775,167 B2
(45) Date of Patent: Jul. 8, 2014

(54) NOISE-ROBUST TEMPLATE MATCHING

(75) Inventors: Gautham J. Mysore, San Francisco, CA (US); Paris Smaragdis, Urbana, IL (US); Brian John King, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 264 days.

(21) Appl. No.: 13/335,686

(22) Filed: Dec. 22, 2011

(65) Prior Publication Data

US 2013/0124200 A1   May 16, 2013

Related U.S. Application Data

(60) Provisional application No. 61/539,355, filed on Sep. 26, 2011.

(51) Int. Cl.
  *G10L 15/14* (2006.01)
(52) U.S. Cl.
  USPC .......................................... 704/211; 704/226
(58) Field of Classification Search
  USPC ................................. 704/211, 226
  See application file for complete search history.

(56) References Cited

U.S. PATENT DOCUMENTS

| 5,596,364 | A | 1/1997 | Wolf et al. |
| 7,418,383 | B2 | 8/2008 | Droppo et al. |
| 7,461,002 | B2 | 12/2008 | Crockett et al. |
| 8,554,553 | B2 * | 10/2013 | Mysore et al. ................ 704/226 |
| 2003/0004712 | A1 | 1/2003 | Erell |
| 2009/0279777 | A1 | 11/2009 | Malfait et al. |
| 2011/0261257 | A1 | 10/2011 | Terry et al. |

OTHER PUBLICATIONS

P.C. Loizou, "Speech Enhancement: Theory and Practice," CRC Press, 1 edition, Jun. 2007, whole book.
L. Rabiner and B.H. Juang, "Fundamentals of Speech Recognition," Prentice Hall, 1 edition, Apr. 1993, whole book.
S. Greenberg and W. Ainsworth, "Listening to Speech: An Auditory Perspective," Lawrence Erlbaum Associates, Mar. 2006, whole book.
Ellis, Dan; "Dynamic Time Warp (DTW) in Matlab"; 2003; retrieved from Internet: http://www.ee.columbia.edu/~dpwe/resources/matlab/dtw/; 4 pages.
Hosom, John-Paul; "Automatic Time Alignment of Phonemes Using Acoustic-Phonetic Information"; Dissertation at Oregon Graduate Institute of Science and Technology; May 2000; 189 pages.
Brett Ninness, Soren John Henriksen; "Time-Scale Modification of Speech Signals"; IEEE Transactions on Signal Processing, vol. 56, No. 4, Apr. 2008; 10 pages.
Hermansky, et al.; "RASTA-PLP Speech Analysis"; International Computer Science Institute; Technical Report TR-91-069; University of California—Berkeley; Berkeley, California; Dec. 1991; 8 pages.
Daniel D. Lee, H. Sebastian Seung; "Learning the parts of objects by non-negative matrix factorization"; Nature, vol. 401; Oct. 21, 1999; Macmillian Magazines Ltd.; pp. 788-791.

(Continued)

*Primary Examiner* — Susan McFadden
(74) *Attorney, Agent, or Firm* — Wolfe—SBMC

(57) ABSTRACT

Noise robust template matching may be performed. First features of a first signal may be computed. Based at least on a portion of the first features, second features of a second signal may be computed. A new signal may be generated based on at least another portion of the first features and on at least a portion of the second features.

20 Claims, 10 Drawing Sheets

(56) References Cited

OTHER PUBLICATIONS

Richard P. Lippman; "Speech recognition by machines and humans"; Speech Communication; vol. 22; 1997; pp. 1-15; Elsevier.

Madhusudana Shashanka; "Latent Variable Framework for Modeling and Separating Single-Channel Acoustic Sources"; Dissertation Defense; Aug. 17, 2007; Cognitive and Neural Systems, Boston University; Boston, Massachusetts; 66 pages.

Smaragdis, et al.; "Supervised and Semi-Supervised Separation of Sounds from Single-Channel Mixtures"; Proceedings of the 7th International Conference on Independent Component Analysis and Signal Separation; London, UK; Sep. 2007; 8 pages.

Hu, et al.; "Subjective Comparison of Speech Enhancement Algorithms"; Proceedings of IEEE International Conference on Acoustics, Speech and Signal Processing; Toulouse, France; 2006; 4 pages.

Ephraim, et al.; "Speech Enhancement Using a—Minimum Mean-Square Error Short-Time Spectral Amplitude Estimator"; IEEE Transactions on Acoustics, Speech and Signal Processing; Dec. 1984; vol. 32, Issue 6; pp. 1109-1121.

Ellis, Dan; "PLP and RASTA (and MFCC, and inversion) in Matlab using melfcc.m and invmelfcc.m"; (c) 2005; retrieved from Internet: http://www.ee.columbia.edu/~dpwe/resources/matlab/rastamat/; 4 pages.

* cited by examiner

Automatic Alignment Block Diagram

Example Feature Extraction

NOISE-ROBUST TEMPLATE MATCHING

PRIORITY INFORMATION

This application claims benefit of priority of U.S. Provisional Application Ser. No. 61/539,355 entitled "Noise-Robust Template Matching" filed Sep. 26, 2011, the content of which is incorporated by reference herein in its entirety.

BACKGROUND

Automatic time alignment of audio has many applications including synchronizing high-quality speech to a low-quality reference recording of the same utterance, aligning utterances of different languages to aid in foreign overdubbing, and synchronizing recorded instrument tracks. Traditional speech features, such as Mel-frequency ceptral coefficients ("MFCC"), struggle in template matching systems, such as dynamic time warping and hidden Markov models, in noisy environments. MFCC values may become distorted so significantly from their nominal values by noise that they become indistinguishable from feature sets of different sounds. Such noisy environments are frequently encountered in a video shoot (e.g., unwanted noise on the set, poor microphone placement, etc.) necessitating actors to overdub the exact dialogue from a video shoot. The process of re-recording actors in the studio is known as automatic dialogue replacement (ADR). If an auto-alignment system is not used, then the actors must painstakingly re-record their lines until the timing is perfect, or a studio engineer must manually fix the timing, which can be a time-consuming and difficult task.

SUMMARY

This disclosure describes techniques and structures for noise robust template matching. In one embodiment, first audio features of a first signal may be computed. Based on at least a portion of the first audio features, second audio features of a second signal may be computed. A new signal may be generated by time aligning a temporal portion of the first audio features with a temporal portion of the second audio features.

In one non-limiting embodiment, the first and second features may be computed using probabilistic latent component analysis (PLCA) or similar non-negative matrix factorization algorithms. First features may include a plurality of spectral basis vectors and a plurality of temporal weights. Second features may include a plurality of spectral basis vectors and a plurality of temporal weights for one signal component (e.g., noise) and may also include a plurality of temporal weights for another signal component (e.g., speech, music, etc.). Computation of the second features may be based on the plurality of spectral basis vectors of the first features. In various embodiments, generation of the new signal, may be based on the relationship between the temporal weights of the first and second signals.

Figure 1:
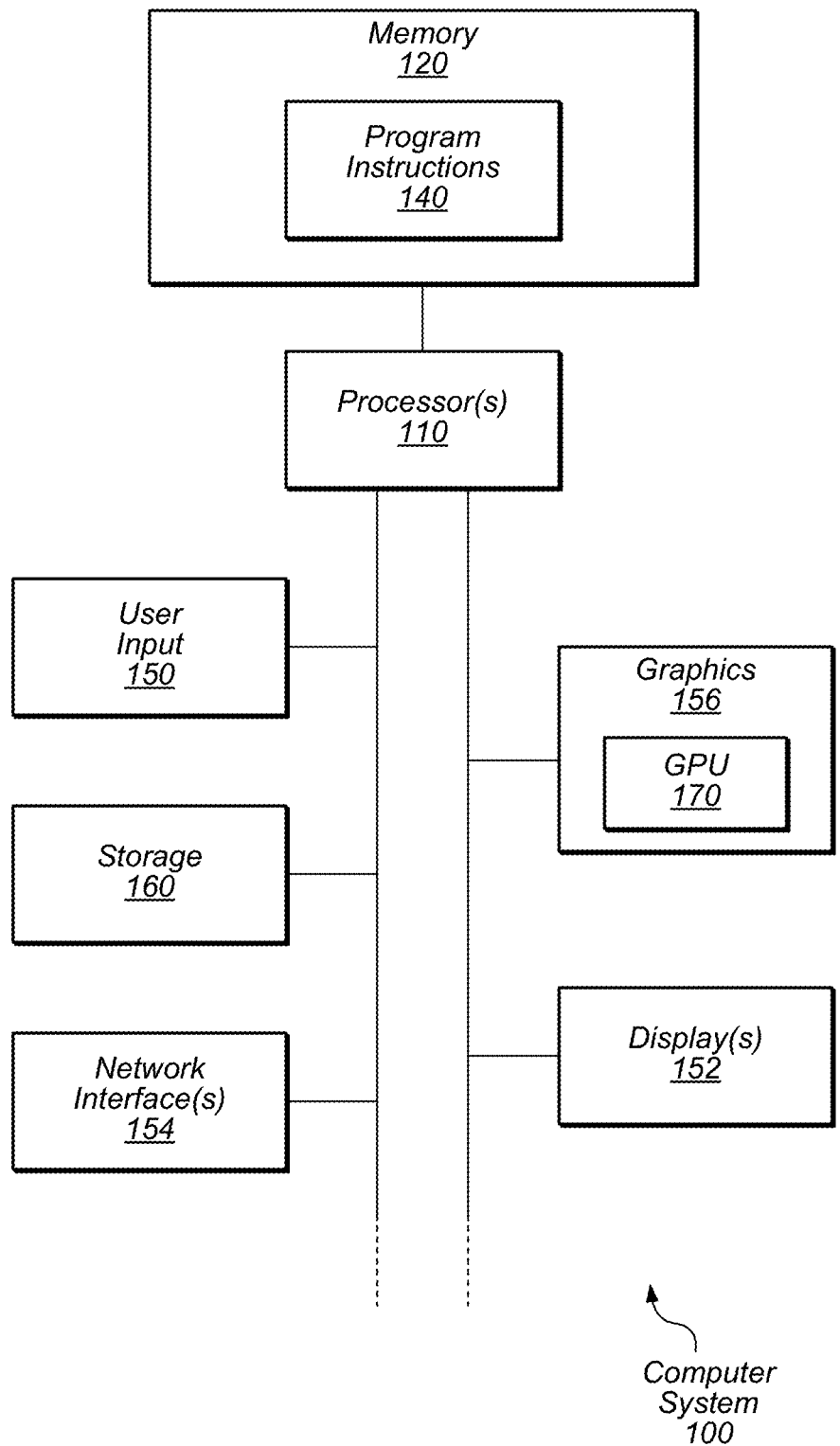
FIG. 1 is a block diagram of an illustrative computer system or device configured to implement some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, the terms "first" and "second" features can be used to refer to any two features. In other words, the "first" and "second" features are not limited to logical features 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Signal." Throughout the specification, the term "signal" may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for video, music, or audio files may include WAV, OGG, RIFF, RAW, AU, AAC, MP4, MP3, WMA, RA, etc.

"Source." The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled a source—e.g., a wall or enclosure. Moreover, in some cases two different entities of the same type—e.g., two different pianos—may be considered to be the same "source" for modeling purposes.

Introduction

This specification first presents an illustrative computer system or device, as well as an illustrative noise-robust template matching module that may implement certain embodiments of methods disclosed herein. The specification then discloses techniques for noise-robust template matching. Various examples and applications are also disclosed. Some of these techniques may be implemented, for example, by a noise-robust template matching module or computer system.

In some embodiments, these techniques may be used in dynamic time warping, template matching systems, hidden Markov models, music recording and processing, source extraction, noise reduction, teaching, automatic transcription, electronic games, and many other applications. As one non-limiting example, the techniques may allow for alignment of a high-quality audio signal to a lower-quality audio signal. Although certain embodiments and applications discussed herein are in the field of audio and video, it should be noted that the same or similar principles may also be applied in other fields. For ease of explanation, various embodiments are described in terms of audio and video signals. It is noted, however, that the disclosed techniques may equally apply to other types of signals as well.

Example System

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In some embodiments, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In some embodiments, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Noise-robust Template Matching Module

Figure 2:
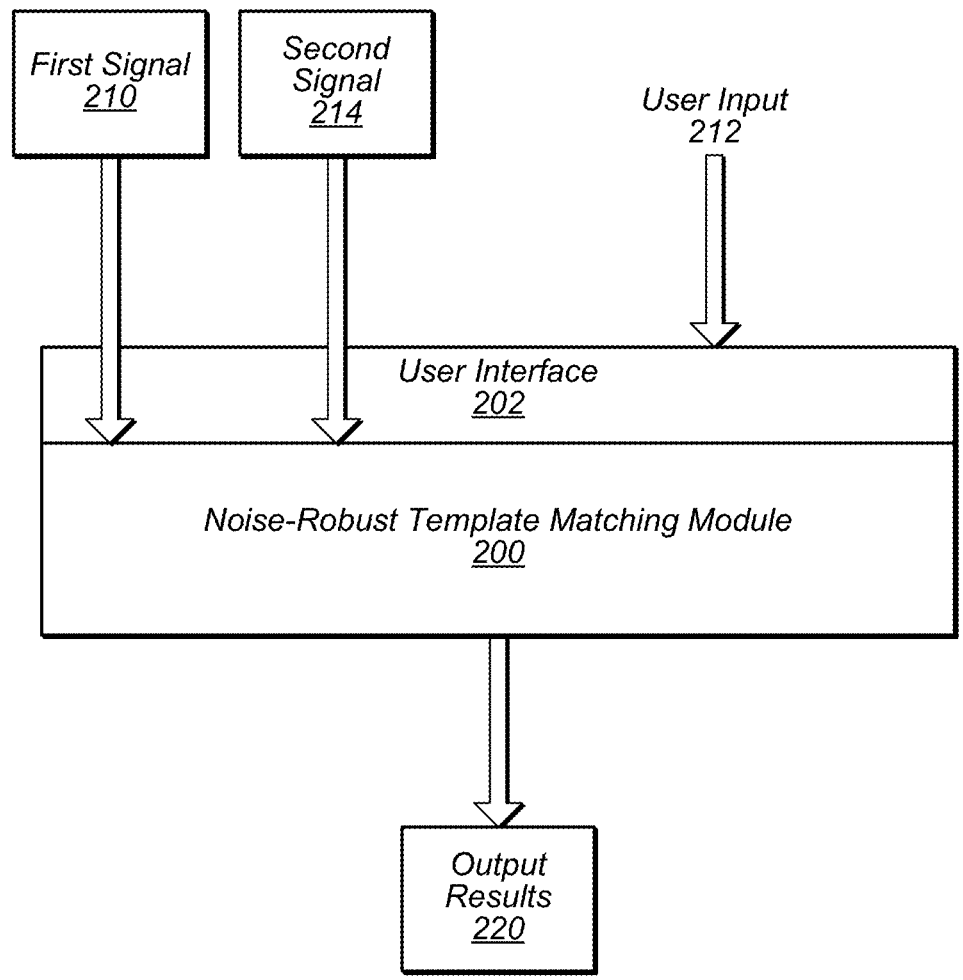
FIG. 2 is a block diagram of an illustrative noise-robust template matching module according to some embodiments.

In some embodiments, noise-robust template matching module 200 may be implemented by processor-executable instructions (e.g., instructions 140) stored on a medium such as memory 120 and/or storage device 160. FIG. 2 shows an illustrative noise-robust template matching module that may implement certain embodiments disclosed herein. In some embodiments, module 200 may provide a user interface 202 that includes one or more user interface elements via which a user may initiate, interact with, direct, and/or control the method performed by module 200. Module 200 may be operable to obtain signal data (e.g., digital, analog, etc.) for first signal (e.g., sound/audio recording) 210 and second signal (e.g., sound/audio recording) 214, receive user input 212 regarding the signals, analyze the signals and/or the input, and output results 220. In an embodiment, the module may include or have access to additional or auxiliary signal-related information, not shown in FIG. 2. Output analysis results 220 may an aligned signal. For instance, output results 220 may be a modified version of first signal 210 that is aligned to second signal 214

Noise-robust template matching module 200 may be implemented as or in a stand-alone application or as a module of or plug-in for a signal processing application. Examples of types of applications in which embodiments of module 200 may be implemented may include, but are not limited to, signal (including sound) analysis, overdubbing, foreign dubbing, musical applications, characterization, search, processing, and/or presentation applications, as well as applications in security or defense, educational, scientific, medical, publishing, broadcasting, entertainment, media, imaging, acoustic, oil and gas exploration, and/or other applications in which signal analysis, characterization, representation, or presentation may be performed. Module 200 may also be used to display, manipulate, modify, classify, and/or store signals, for example to a memory medium such as a storage device or storage medium.

Figure 3:
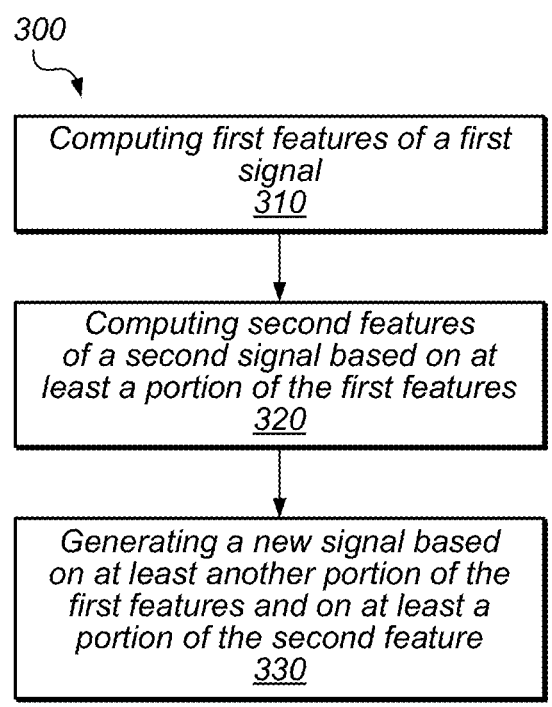
FIG. 3 is a flowchart of a method for noise-robust template matching according to some embodiments.

Turning now to FIG. 3, one embodiment of noise-robust template matching is illustrated. While the blocks are shown in a particular order for ease of understanding, other orders may be used. In some embodiments, method 300 of FIG. 3 may include additional (or fewer) blocks than shown. Blocks 310-330 may be performed automatically, may receive user input, or may use a combination thereof. In some embodiments, one or more of blocks 310-330 may be performed by noise-robust template matching module 200 of FIG. 2.

As illustrated at 310, first features of a first signal (e.g., first sound recording) may be computed. The first signal may, in one embodiment, be a studio version, high-quality recording, such as an overdub in an ADR application. Other example first signals may include a recording of a musical instrument, musical performance, translated dialog/foreign dubbing, etc. The first signal may be in the form of one or more spectrograms of a signal. In other scenarios, a time-domain signal may be received and processed to produce a time-frequency representation or spectrogram. In some embodiments, the spectrograms may be spectrograms generated, for example, as the magnitudes of the short time Fourier transform (STFT) of the signals. The spectrograms may, in some instances, be narrowband spectrograms (e.g., 32 ms windows). The STFT subbands may be combined in a way so as to approximate logarithmically-spaced subbands. In doing so, potentially adverse effects (e.g., very dissimilar features) from differences in pitch between the two sound recordings may be mitigated and small differences in pitch may not result in significant differences in features (e.g., spectral basis vectors, weights). In various embodiments, STFTs and subband representations may be calculated for each of the first and second signals before computing their respective features.

In some embodiments, the first signal (e.g., sound recording) may be analyzed, on a frame by frame basis, to find its features or characteristics (e.g., speech characteristics, other audio characteristics, etc.). Features may include spectral features such as spectral basis vectors, which may be spectral building blocks of the signal. Features may also include temporal features, such as speech weights, noise weights, etc. The weights may define a temporal evolution of a signal such that at each time instance of the signal, the signal may be defined by a linear combination of the blocks. In one embodiment, the features may be computed with an algorithm, such as Probabilistic Latent Component Analysis (PLCA), non-negative matrix factorization (NMF), non-negative hidden Markov (N-HMM), non-negative factorial hidden Markov (N-FHMM), or a similar algorithm. For additional details on the N-HMM and H-FHMM algorithms, see U.S. patent application Ser. No. 13/031,357, filed Feb. 21, 2011, entitled "Systems and Methods for Non-Negative Hidden Markov Modeling of Signals", which is hereby incorporated by reference.

In one embodiment, PLCA may be performed on the first sound recording, for example, on an unaligned, high-fidelity, studio-quality recording. $N_{speech}$ speech basis vectors and weights may be computed as a result of performing PLCA. In an embodiment using PLCA, PLCA may model data (e.g., a sound recording) as a multi-dimensional joint probability distribution. Consider a time-frequency distribution of the source being modeled (e.g., non-stationary noise) $P_r(f, t)$ where f is frequency and t is time. Intuitively, the PLCA model may operate on the spectrogram representation of the audio data and may learn an additive set of basis functions that represent all the potential spectral profiles one expects from a sound. For example, the observed time-frequency magnitude distribution P(f, t) may be the normalized magnitude spectrogram of the signal:

$$X_N(f, t) \approx P(f, t) = \sum_{z=1}^{N} P(z)P(f|z)P(t|z) \quad (1)$$

where $$X_N(f, t) = \frac{|X(f, t)|}{\sum_{f,t} |X(f, t)|} \quad (2)$$

with X(f,t) being the short-time Fourier transform of a signal and $X_N(f,t)$ being the normalized STFT. PLCA may then enable the hidden, or latent, components of the data to be modeled as the three distributions. P(f|z) corresponds to the spectral building blocks, or basis vectors, of the signal; P(t|z) corresponds to how a weighted combination of these basis vectors can be combined at every time t to approximate the observed signal; and P(z) corresponds to the relative contribution of each base to the entire observed signal. Each distribution may be discrete. Given a spectrogram, the model parameters may be estimated using the expectation-maximization (EM) algorithm. In an embodiment using PLCA, because everything may be modeled as distributions, all of the components may be implicitly nonnegative. By using nonnegative components, the components may all be additive, which can result in more intuitive models. In some embodiments, prior knowledge of the signal may be used, such as incorporating entropic priors for sparsity, and adding temporal coherence through hidden Markov models. As described herein, other models may be used. For example, non-probabilistic models, such as non-negative matrix factorization (NMF), N-HMM and N-FHMM may also be used. Method 300 is described in terms of PLCA but the method could be adapted to work within an NMF, N-HMM, or N-FHMM framework as well.

In one embodiment, to compute features, the magnitude subband representation, or spectrogram, may be calculated for the first signal. PLCA may then be performed on the spectrogram of the first signal. $F_u$, the feature vector for the first signal may be constructed as $F_u(z,t)=P_u(t,z)=P_u(t|z)P_u(z)$, for $z \in Z_u$, where $Z_u$ is the set of speech basis vectors learned in the first signal (e.g., unaligned signal). $F_u$ may be thought of as a matrix of values that indicate how the speech basis vectors can be linearly combined to approximate the observed signal. The basis vectors learned from the first signal at 310 may be reused as the speech basis vectors for the second signal at 320.

As shown at 320, second features of a second signal may be computed. The second signal may also be referred to as a reference signal. In one embodiment, the second signal may be a low quality, reference recording, for example, as in an ADR application. The second signal may be of the same speaker from the first signal (e.g., a same actor/actress in both signals), the same musical instrument, a different speaker (e.g., foreign language recording, two different singers each singing the same song), a different musical instrument (e.g., playing the same song as the musical instrument from the first signal), or a same or different musical performer, among other examples. As was the case with the first signal, the second signal may be in the form of one or more spectrograms. In other scenarios, a time-domain signal may be received and processed to produce a time-frequency representation or spectrogram. In some embodiments, the spectrograms may be spectrograms generated, for example, as the magnitudes of the short time Fourier transform (STFT) of the signals. The spectrograms may, in some instances, be narrowband spectrograms (e.g., 32 ms windows). The STFT subbands may be combined in a way so as to approximate logarithmically-spaced subbands. In doing so, potentially adverse effects (e.g., very dissimilar features) from differences in pitch between the two sound recordings may be mitigated and small differences in pitch may not result in significant differences in features (e.g., weights). In various embodiments, subband representations may be calculated for each of the first and second sound recording signals before computing the respective features, for example, before or in conjunction with block 310.

In some embodiments, the computation of the second features may be computed as in 310 but may also be based on at least a portion of the computed first features. For instance, the spectral basis vectors (e.g., speech basis vectors) of the first signal may be used for computing the features of the second signal, for instance, using PLCA. When performing PLCA on the second signal, some additional basis vectors can be added that can model other components of the signal, such as noise. Because PLCA may model a signal as a linear combination of basis vectors, introducing noise may not affect the speech weight features very much because the noise in the second signal can be learned and modeled explicitly by the algorithm. In one embodiment, new noise basis vectors, noise weights, and speech weights may be computed while leaving the speech basis fixed. Based on the fixed speech basis, everything that is not determined by PLCA to be speech may be determined as noise. Thus, in some embodiments, a plurality of basis vectors and a plurality of temporal weights may be computed for one component (e.g., noise) of the second signal and a plurality of temporal weights may be computed for another component (e.g., speech) of the second signal.

In one embodiment, PLCA may be performed on the second signal, for example, on a noisy reference signal, on a frame by frame basis. $N_{speech}$ speech weights may be computed as a result of performing PLCA. PLCA may be performed similarly as described at 310. In one example, the speech basis vectors learned at 310 for the first signal may be used by the PLCA algorithm. Noise basis vectors $N_{noise}$ may be added. The PLCA algorithm may allow the noise basis vectors to be updated to adapt to the noise but keep the speech basis vectors constant. In one embodiment, the features of the second signal may be computed by $F_r(z,t)=P_r(t,z)=P_r(t|z)P_r(z)$, for $z \in Z_u$.

In addition to performing well where the second signal is noisy, the method of FIG. 3 may be adjusted when the second signal (reference signal) has little to no noise. In one embodiment, if it is known that the reference signal has little to no noise, PLCA may be performed on the second signal to find a new $P_r(z)$ and $P_r(t|z)$ with the $P(f|z)$ basis vectors learned at 310. The reference features may then be computed similarly as described at 310 resulting in $P_r(z,t)$. Because the same basis set may be used for both the first and second signals, parts of audio similar in the second signal may have values of $P_r(t|z)$ similar to the values of $P_u(t|z)$. Thus, the features learned from the two signals may correspond to the same sounds because they share the same speech basis. Moreover, if the vocal characteristics between the two signals are similar, the features of the corresponding parts of dialogue may match closely and result in accurate alignment.

In some embodiments, an enhanced second signal may be synthesized by performing semi-supervised source separation based on the speech basis vectors and weights. In such embodiments, features for the enhanced second signal may be computed based on the computed first features, or in other instances, independently without using the computed first features. In some cases, independent computation of features may be performed using algorithms other than PLCA.

As shown at 330, a new signal may be generated based on the first and second features. The new signal may be generated by time aligning a temporal portion of the first audio features with a temporal portion of the second audio features. In one embodiment, the first and second features may each include matrices of speech weights for the first and second signals, respectively. The basis vectors and noise weights may, in some embodiments, be discarded. The first and second features may be used to analyze how the unaligned first signal's frames of features can be warped in time (e.g., shifting by a global offset or sampling factor, compressing, stretching, etc.) to best fit the second signal's features.

In one embodiment, the warping in time (e.g., dynamic time warping) may use a similarity matrix of the reference (e.g., second) and unaligned (e.g., first) features. In some cases, the similarity matrix may be a two-dimensional square matrix. One dimension may be the length, in number of windows, for the reference signal, and the other dimension may be the length of the signal for the unaligned, studio version. Each element of the matrix may give a cosine distance between features. An optimal path may be determined to minimize the error between the first and second features such that the path is most similar in the most number of planes. For instance, a path may indicate that to align a given frame of the first and second signals, the reference signal should be advanced one frame and the unaligned signal should be advanced one frame as well. For another frame, a path may indicate that the reference signal should be advanced two frames and the unaligned signal should remain on the same frame. The paths may indicate whether to stretch, compress, time-shift, or otherwise warp one of the signals to better match the other signal.

In some embodiments, the similarity matrix may calculate the cosine distance of the reference and unaligned feature vectors (e.g., temporal speech weights) at each time window as follows:

$$S(F_r(t_a), F_u(t_b)) = \cos(\theta) = \frac{F_r(t_a) \cdot F_u(t_b)}{\|F_r(t_a)\| \|F_u(t_b)\|} \quad (3)$$

$$\text{where } S \in [-1, 1]^{T_r, T_u}$$

and where $T_r$ and $T_u$ may be the number of windows in time of the reference and unaligned signals. In one embodiment, the measure may be invariant to scaling with a non-negative value. The two signals may match well even if the two signals have different amplitude but similar spectral characteristics. In one embodiment, the time warping algorithm may use the similarity matrix to calculate the path through the matrix that results in the highest similarity score. In some instances, the similarity matrix may exhibit a proper path for alignment.

Figure 10A:
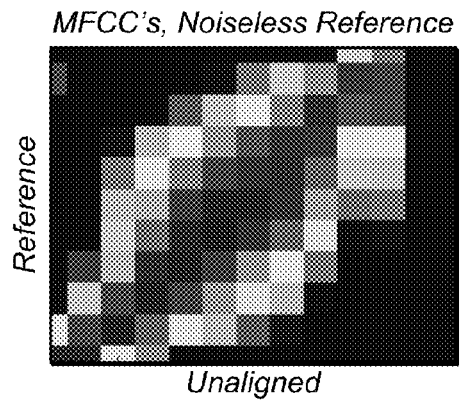
FIGS. 10A-F illustrate a comparison of similarity matrices based on various techniques according to some embodiments.
Figure 10B:
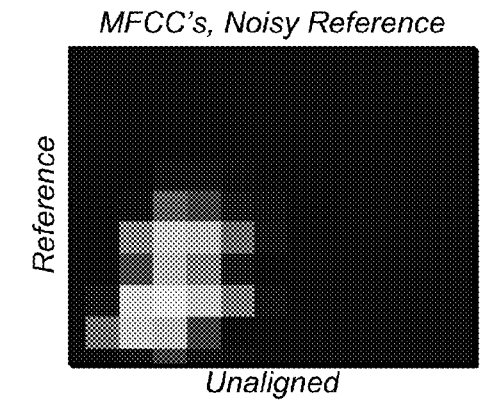
Figure 10C:
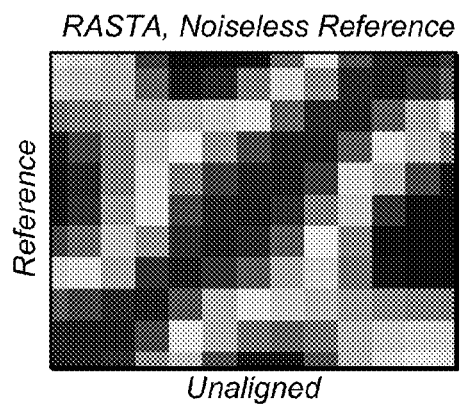
Figure 10D:
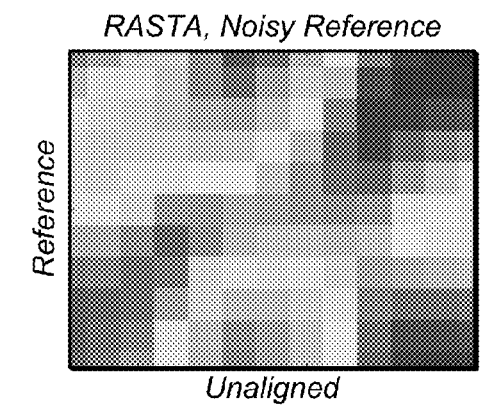
Figure 10E:
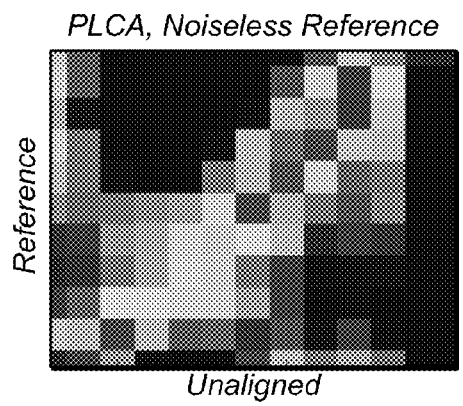
Figure 10F:
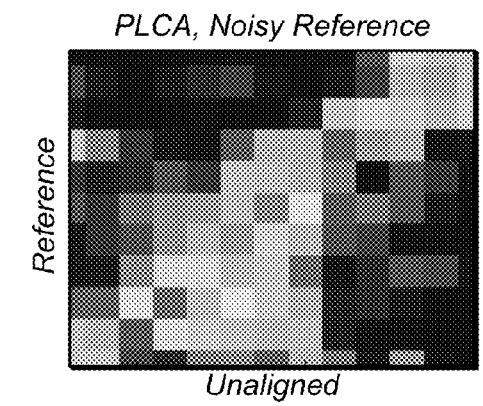

FIGS. 10A-F illustrate example similarity matrices corresponding to features computed by the method of FIG. 3 and other techniques. The y-axis of the similarity matrix may represent the reference signal and the x-axis may represent the unaligned signal. Each of the similarity matrices represents the same portion of an overall similarity matrix. The beginning of each of the reference and unaligned signals is at the bottom left corner of each of FIGS. 10A-F. The similarity matrix of FIG. 10A is based on MFCC feature computation without noise, FIG. 10B on MFCC feature computation with noise (5 dB SNR); FIGS. 10C and D are based on relative spectral transform-perceptual linear prediction (RASTA-PLP) feature computation with and without noise (5 dB SNR), respectively; and FIGS. 10E and F are based on features computed by the method of FIG. 3 with and without noise (5 dB SNR), respectively. In one embodiment, the path may be clearly indicated and may result from having much higher values than neighboring frames. If the path is clearly indicated, accurate alignment may take place. Note that while MFCC and RASTA-PLP perform respectably without noise, the clear and accurate path is notably absent in the presence of noise (FIGS. 10B and 10D). On the other hand, the method of FIG. 3 performs well and has a clearly defined path with or without noise.

Based on the analysis of the warping of the first signal, a new signal, or aligned signal, may be synthesized that has the temporal characteristics of the reference and the spectral characteristics of the unaligned signal.

In addition to overdubbing, the method of FIG. 3 may apply in other situations as well. For instance, in a foreign dubbing embodiment, the method of FIG. 3 may allow for the audio in one signal to more closely follow the other signal (e.g., second signal, reference signal) such that utterances or other audio overlap more closely. For example, certain audio features from the two signals may be stretched, compressed, or shifted such that the lengths of those features are same and that they overlap in time. As another example application, consider a scenario in which two saxophones in a musical performance are off in timing. The method of FIG. 3 may be able to automatically align the signals from the two saxophones to be more closely synchronized.

In some embodiments, the method of FIG. 3 may be used in situations in which both signals are noisy. In addition, the method of FIG. 3 may be used in situations in which speakers from the two signals have significantly different spectral characteristics. In such situations, the method of FIG. 3 may utilize frequency shift-invariant basis vectors by incorporating shift-invariant PLCA.

By using the machine-learning noise-robust template matching techniques described herein, a reference signal, such as a noisy reference signal, may be analyzed more accurately and more robustly by using knowledge of similarities with another signal. Further, by exploiting knowledge of the other signal in analyzing the noise, introduction of artifacts at the feature computation level may be minimized. Moreover, by modeling the noise of the noisy reference signal separately, alignment to a high-fidelity unaligned signal may be performed more accurately.

Figure 4:
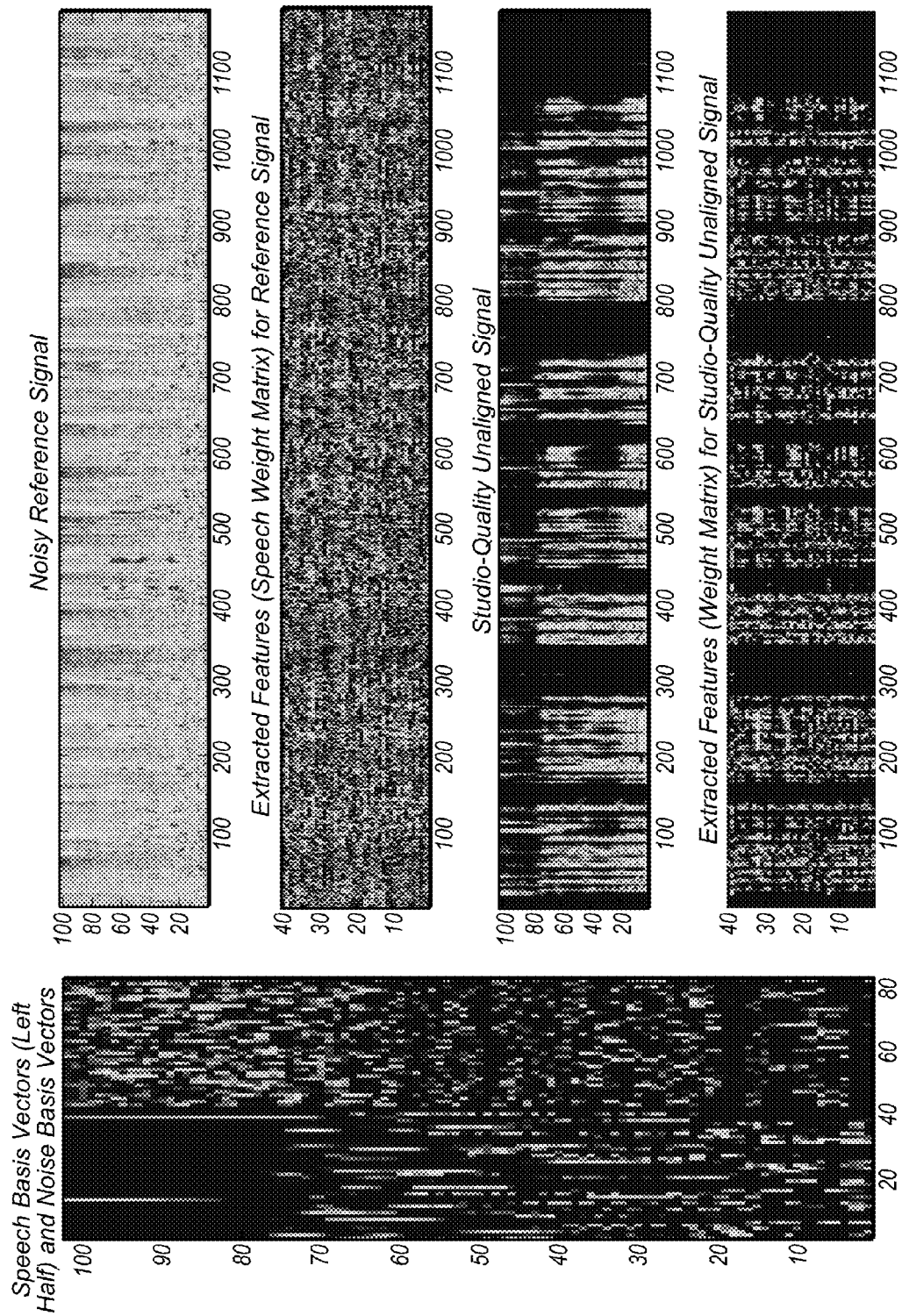
FIG. 4 illustrates example feature extraction using PLCA according to some embodiments.

FIG. 4 illustrates graphical representations in the form of spectrograms of example first and second signals, labeled studio-quality unaligned signal and noisy reference signal, respectively. FIG. 4 further illustrates example extracted features (e.g., speech weight matrices) for those signals, which may be produced at blocks 310 and 320 of the method of FIG. 3. In the leftmost image of FIG. 4, speech and noise basis vectors may be seen, which were produced from the noisy reference signal.

Figure 5:
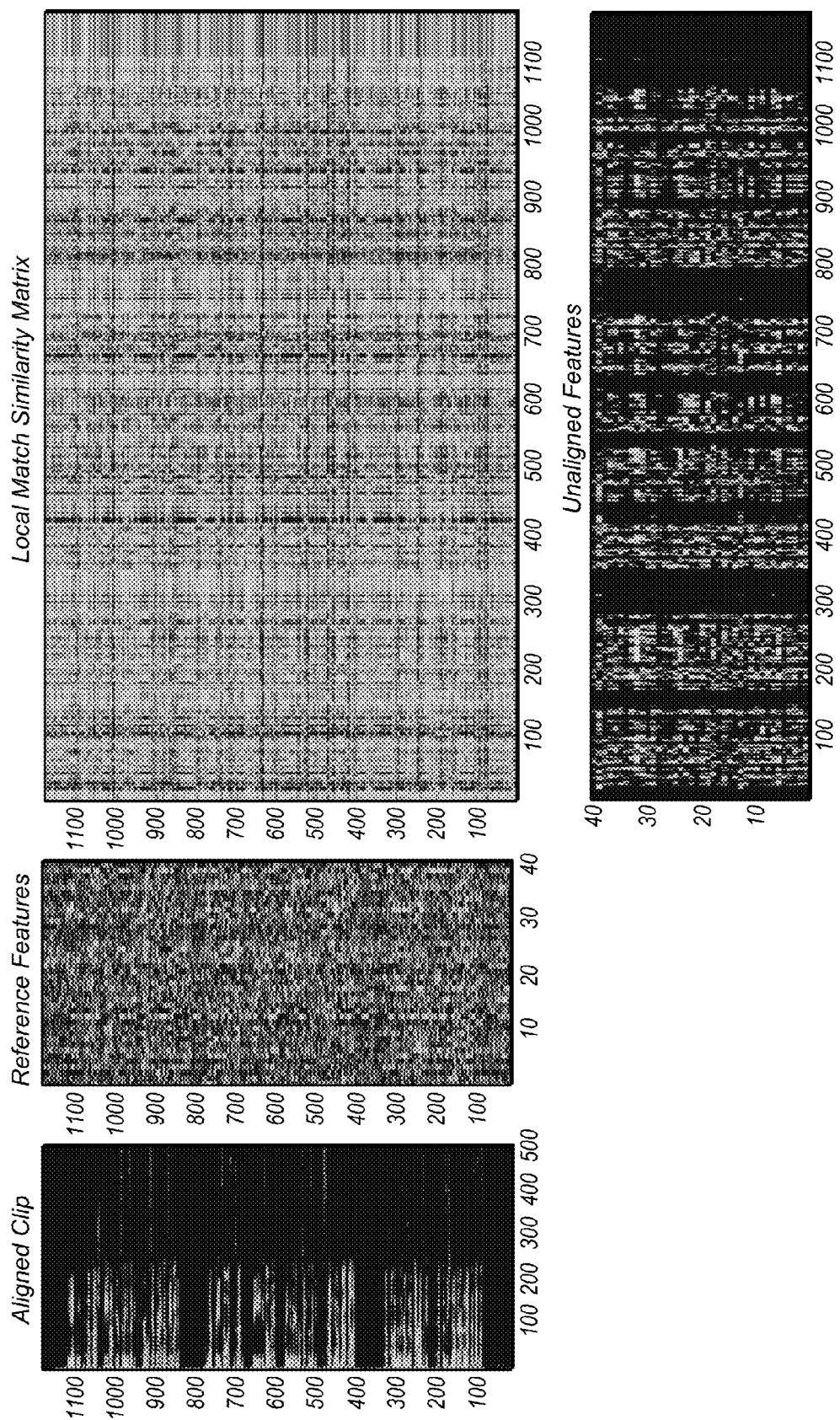
FIGS. 5-6 illustrate example feature alignment according to some embodiments.
Figure 6:
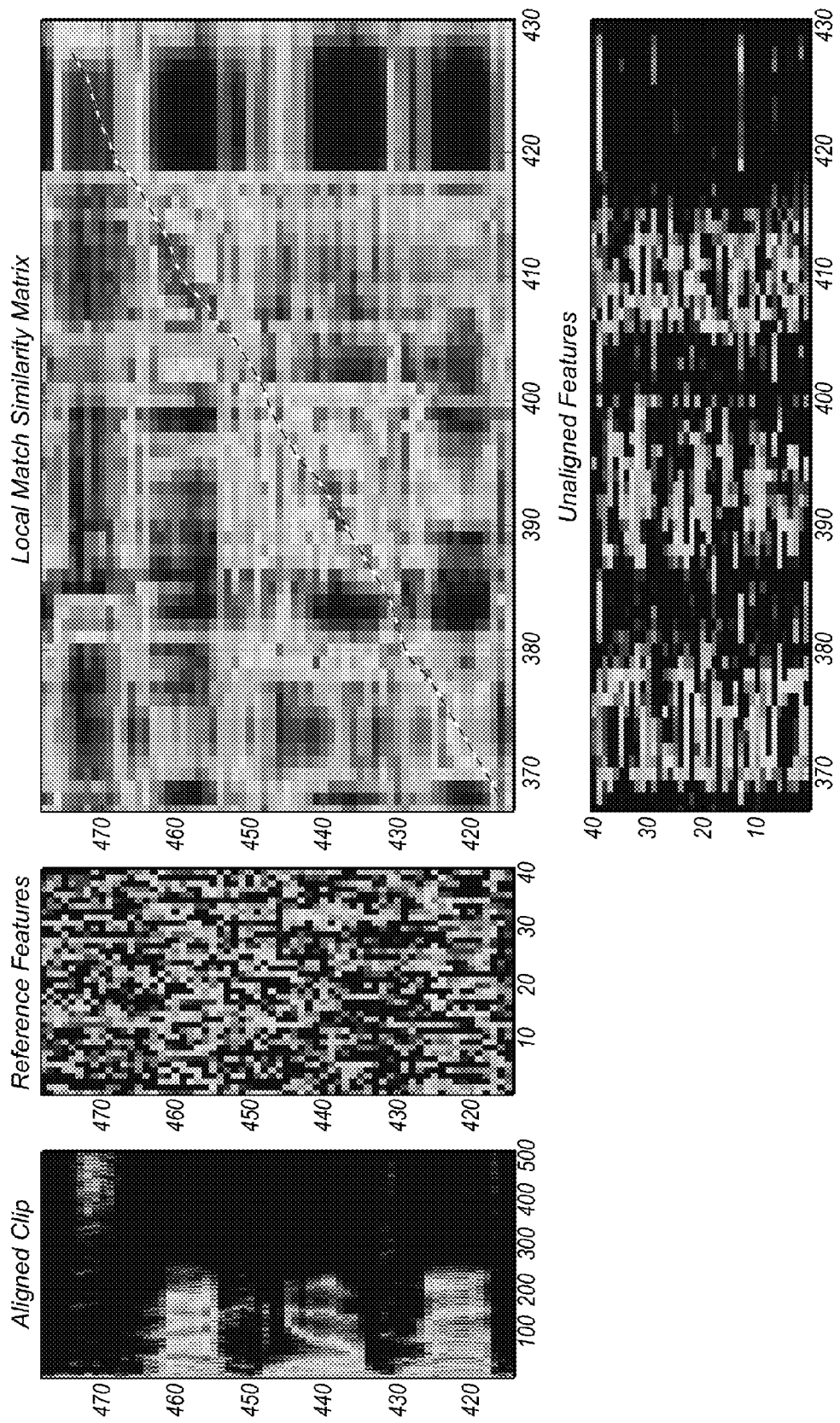

Extending the example of FIG. 4, FIGS. 5-6 illustrate spectrograms of an example aligned clip or signal, produced by the method of FIG. 3. FIG. 6 represents a zoomed in version of FIG. 5. FIGS. 5-6 further illustrate features extracted from the noisy reference signal and the unaligned signal, also in the form of spectrograms. FIGS. 5-6 further illustrate an example local match similarity matrix, produced at block 330. As described herein, the aligned clip may be synthesized based on the similarity matrix. FIG. 6 includes a diagonal line from the lower left of the local match similarity matrix to the upper right. The line may represent an optimal path for aligning the unaligned signal to the reference signal.

Figure 7:
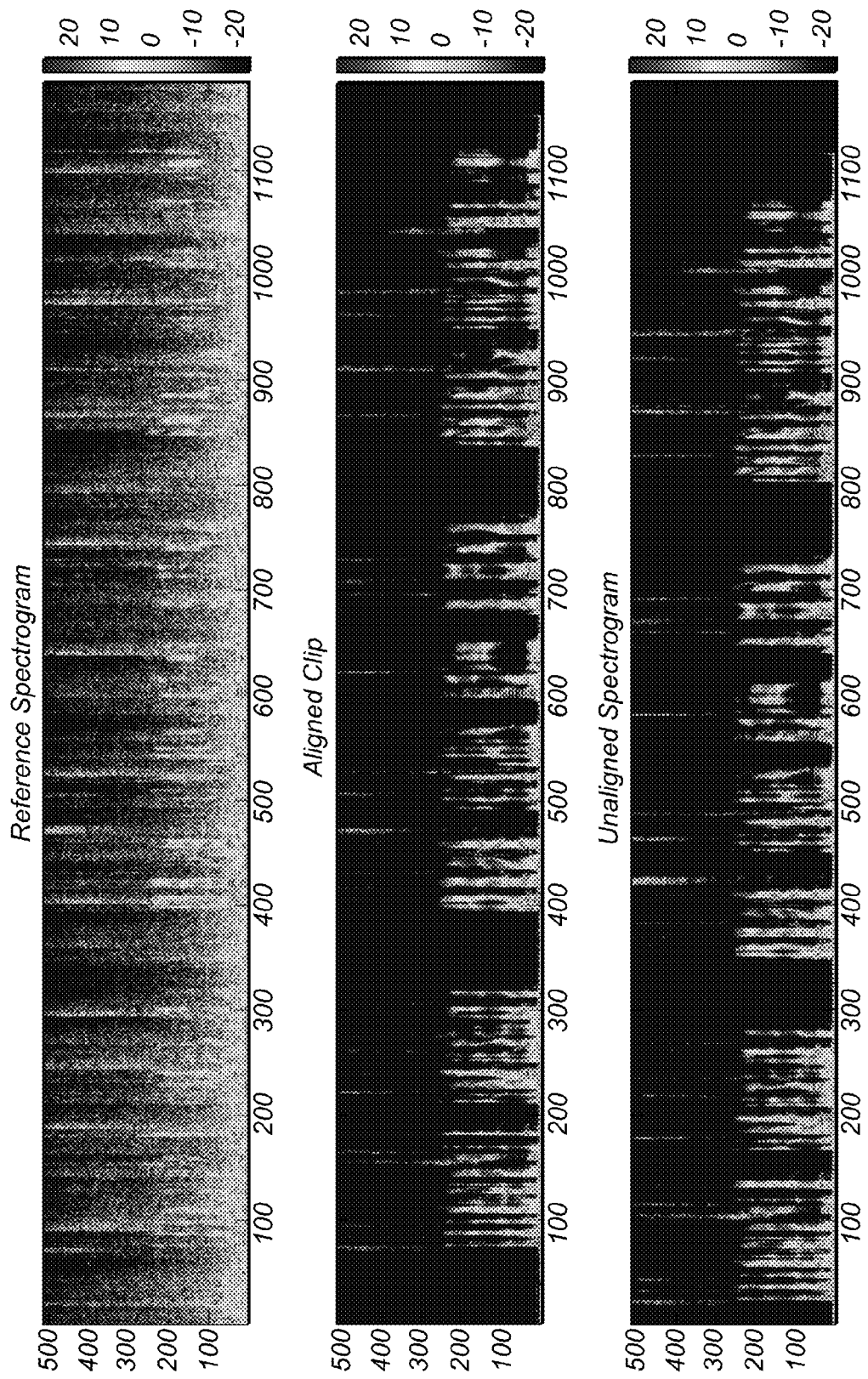
FIG. 7 illustrates example unaligned, reference, and aligned signals according to some embodiments.

FIG. 7 illustrates spectrograms of the first (unaligned), second (reference) signals, and aligned signals. The aligned clip may be a new signal having temporal characteristics of the reference signal and spectral audio characteristics of the unaligned signal, according to the various techniques described herein.

Figure 8A:
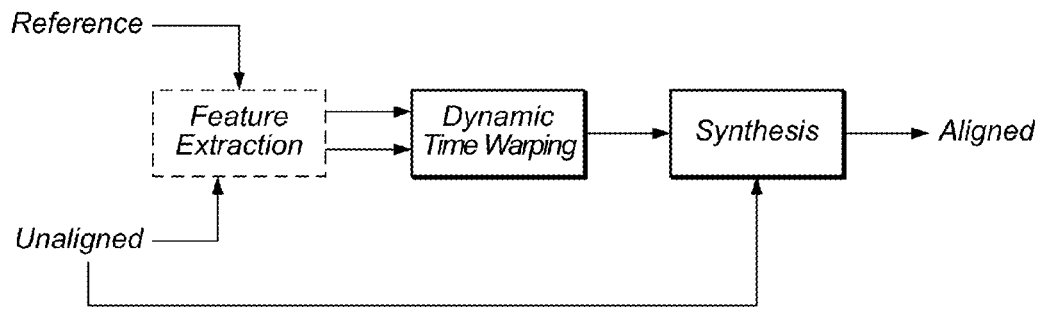
FIGS. 8A-8B illustrate block diagrams of an automatic alignment system and feature extraction, respectively, according to some embodiments.

FIG. 8A is a block diagram of an automatic alignment technique according to various embodiments. As shown, a feature extraction block may receive unaligned and reference signals. The extracted features may be provided to the dynamic time warping module, which may determine a similarity matrix that defines how the unaligned signal may be compressed, stretched, or shifted to better match the temporal characteristics of the reference signal. The similarity matrix may be provided to the synthesis module, which may also receive the unaligned signal. The synthesis module may produce a new signal, shown as aligned signal, which may incorporate the temporal characteristics of the reference signal and the audio characteristics (e.g., speech, music) of the unaligned signal.

Figure 8B:
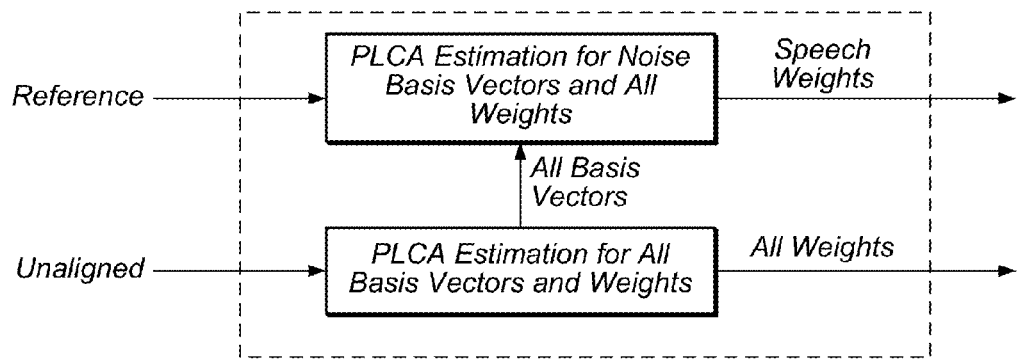

FIG. 8B illustrates an example embodiment of the feature extraction block of FIG. 8A. As shown, PLCA estimation may be performed on the unaligned signal for all basis vectors and weights of the signal. Then, PLCA estimation may be performed on the reference signal for noise basis vectors and all weights (e.g., speech weights, noise weights). As illustrated, the PLCA estimation on the reference signal may also be based on the computed basis vectors from the unaligned signal. The feature extraction block may then output respective speech weights from the PLCA estimations of the reference signal and the unaligned signal.

Figure 9:
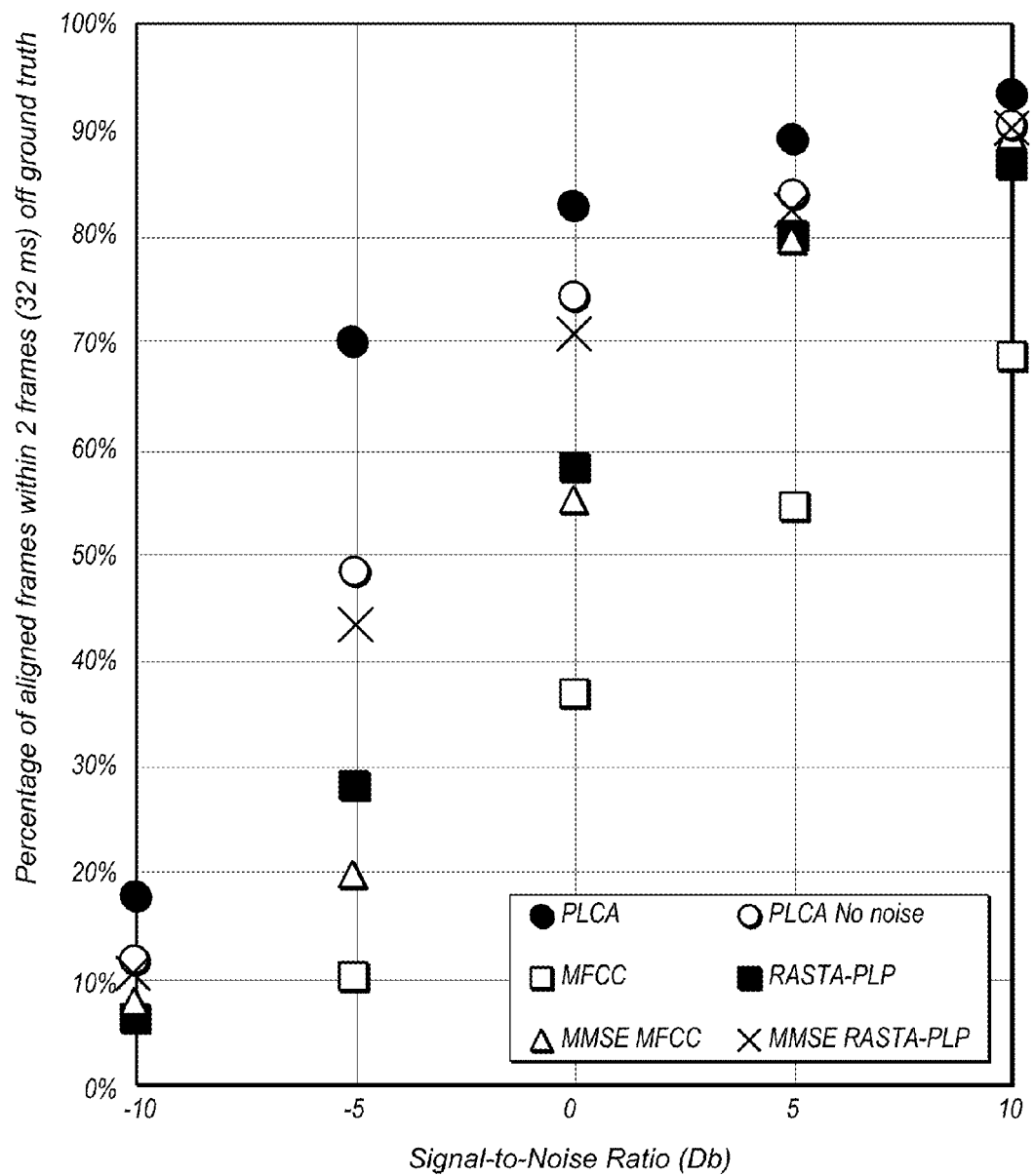
FIG. 9 shows a plot of frame alignment performance according to some embodiments.

FIG. 9 illustrates an example comparison of the method of FIG. 3 with MFCC and RASTA-PLP in an automatic time alignment task. In the example comparison, two recordings of the same four sentences were made by three males and one female. The speakers were prompted to speak naturally in both recordings, but no feedback was given about the timing of the recordings. As a result, the timings, pitch contours, and pronunciation were noticeably different between the two recordings, but not dramatically different. Noise was added to the reference recordings at a −10, −5, 0, +5, and +10 dB signal-to-noise ratio (SNR). The SNR was calculated by the average power of active speech versus the average power of the noise. Each of the clips was sampled at 16 kHz. Features computed by the method of FIG. 3 were compared with features computed by MFCC and RASTA-PLP. In order to mitigate the effect of the noise, the method of FIG. 3 was also compared with MFCC and RASTA-PLP for a denoised version of the noisy signal. For the denoising, the two same sets of features were also computed on the reference signals processed by Ephraim-Malah enhancement. The same dynamic time warping algorithm was used for all sets of features. The output of the dynamic time warping algorithm was compared to the ground truth, with the ground truth being found by first performing alignment on the reference and the unaligned clips with no noise added to the reference. MFCCs were used to compute the ground truth. Time-aligned synthesized signals were then compared with the reference signals and verified that the alignment performance was satisfactory.

For each of the feature sets, the same window length (32 ms) and skip size (50%) was used. The MFCC features were computed using the first 8 discrete cosine transform (DCT) coefficients from the 29 Mel-spaced subband representation (number of bands determined by floor $(3*\log(f_s))$. The RASTA-PLP model used an 8th-order PLP model. Two different example PLCA models were used in the comparison. The first used 40 basis vectors for speech and 40 for noise. The second PLCA model used 40 basis vectors for speech without separately modeling the noise. For both PLCA-based methods, the subbands were combined into a 102 positive frequency, logarithmically-spaced subband representation. A logarithmically-spaced subband representation may help mitigate differences in pitch between the first and second signals.

In comparing dynamic time warping frame mapping of the aligned versions to the ground truth, a frame was labeled as correct if it was within 2 frames of the ground truth mapping. In the example comparison, because a 32 ms window with a 50% overlap was used, accuracy may be to within 32 ms or within one video frame for a 30 frames per second rate. FIG. 9 shows a plot of the percentage of aligned frames within 2 frames of the ground truth for the various techniques. As illustrated, both PLCA-based methods, corresponding to the method of FIG. 3, performed better than the other methods, especially at low SNR values. The other methods performed poorly at those low SNR values.

* * *

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:
obtaining, via a computing device, a first signal;
analyzing the first signal for a first plurality of audio features, the first audio features including one or more spectral portions and one or more temporal portions;
obtaining, via a computing device, a second signal;
analyzing the second signal for a second plurality of audio features based on at least a portion of the first audio features, the second audio features including one or more spectral portions and one or more temporal portions; and
automatically time aligning a temporal portion of the first audio features with a temporal portion of the second audio features.

2. The method of claim 1, wherein said computing first audio features and said computing second audio features are each performed using probabilistic latent component analysis (PLCA) or non-negative matrix factorization (NMF).

3. The method of claim 1, wherein said computing the first audio features includes computing a plurality of spectral basis vectors and a plurality of temporal weights.

4. The method of claim 1, wherein the at least a portion of the computed first audio features upon which said computing the second audio features is based includes a plurality of spectral basis vectors.

5. The method of claim 1, wherein said computing second audio features of the second signal includes determining spectral basis vectors and temporal weights for one signal component and determining temporal weights for another signal component, wherein said determining spectral basis vectors and temporal weights for the one signal component is based on spectral basis vectors of the first audio features.

6. The method of claim 1, wherein the at least another portion of the first audio features include temporal weights of the first signal and wherein the at least a portion of the second audio features include temporal weights of a component of the second signal.

7. The method of claim 1, wherein the first signal is a time-domain signal, and wherein said computing first audio features of the first signal includes processing the first signal to produce a spectrogram of the first signal.

8. The method of claim 1, wherein said computing first audio features of the first signal includes:
calculating a spectrogram for the first signal; and
computing a plurality of basis vectors that are linearly combinable to approximate the first signal.

9. The method of claim 1, wherein the first signal is less noisy or equally noisy than the second signal.

10. The method of claim 1, wherein the first and second signals are each separate audio recordings.

11. The method of claim 1, wherein said computing first audio features and said computing second audio features are each performed on a frame by frame basis.

12. The method of claim 1, wherein said time aligning includes warping temporal weights of the first audio features in time to fit temporal weights of the second audio features and synthesizing a new signal.

13. A method, comprising:
obtaining, via a computing device, a first signal;
analyzing the first signal for a first plurality of audio features, the first audio features including one or more spectral portions and one or more temporal portions;
obtaining, via a computing device, a second signal;
analyzing the second signal for a second plurality of audio features based on at least a portion of the first audio features, the second audio features including one or more spectral portions and one or more temporal portions; and
receiving, in a user interface of the computing device, user inputs for time aligning a temporal portion of the first audio features with a temporal portion of the second audio features.

14. The method of claim 13, wherein said computing the first audio features includes computing a plurality of spectral basis vectors and a plurality of temporal weights.

15. The method of claim 13, wherein said computing second audio features of the second signal includes determining spectral basis vectors and temporal weights for one signal component and determining temporal weights for another signal component, wherein said determining spectral basis vectors and temporal weights for the one signal component is based on spectral basis vectors of the first audio features.

16. The method of claim 13, wherein the at least another portion of the first audio features include temporal weights of the first signal and wherein the at least a portion of the second audio features include temporal weights of a component of the second signal.

17. The method of claim 13, wherein said computing first audio features and said computing second audio features are each performed using probabilistic latent component analysis (PLCA).

18. A system, comprising:
at least one processor; and
a memory comprising program instructions, wherein the program instructions are executable by the at least one processor to:
obtain a first signal;
analyze the first signal for a first plurality of audio features, the first audio features including one or more spectral portions and one or more temporal portions;
obtain a second signal;
analyze the second signal for a second plurality of audio features based on at least a portion of the first audio features, the second audio features including one or more spectral portions and one or more temporal portions; and
automatically time align a temporal portion of the first audio features with a temporal portion of the second audio features.

19. The system of claim 18, wherein said computing second audio features of the second signal includes determining spectral basis vectors and temporal weights for one signal component and determining temporal weights for another signal component, wherein said determining spectral basis vectors and temporal weights for the one signal component is based on spectral basis vectors of the first audio features.

20. The system of claim 18, wherein the at least another portion of the first audio features include temporal weights of the first signal and wherein the at least a portion of the second audio features include temporal weights of a component of the second signal.

* * * * *